Nov. 3, 1936.  B. DICK  2,059,728
PACKING CUP
Filed May 29, 1933
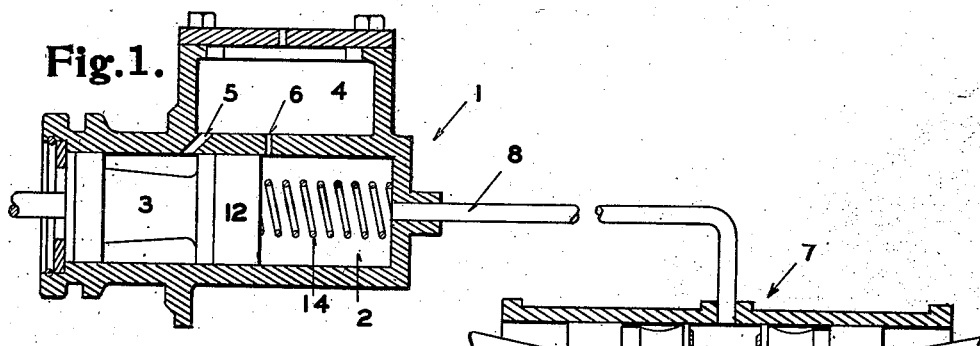
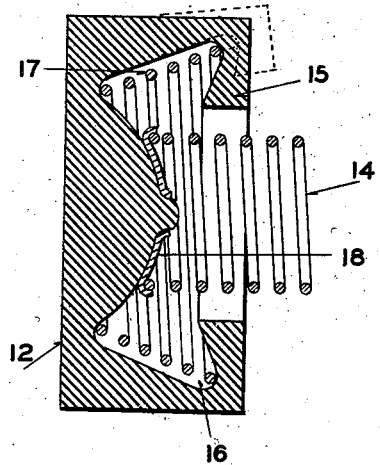
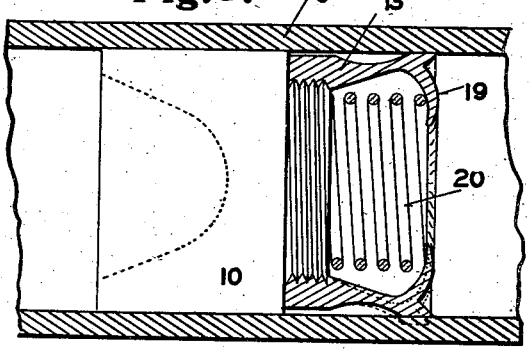
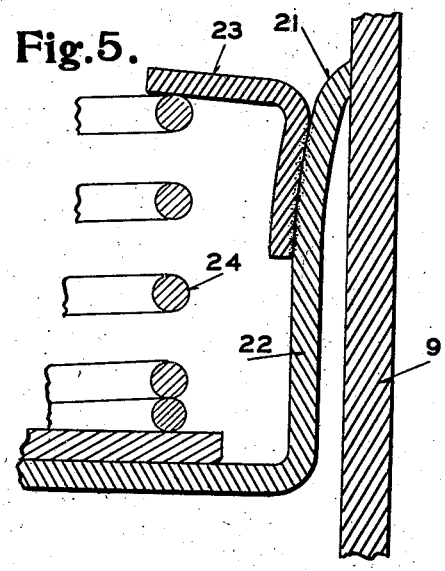
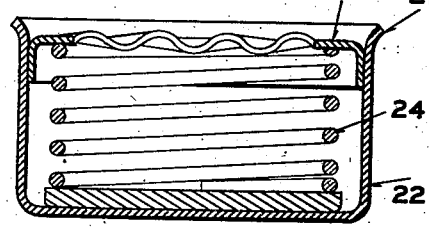
Inventor
BURNS DICK
By *E. E. Huffman*
Att'y.

Patented Nov. 3, 1936

2,059,728

UNITED STATES PATENT OFFICE 2,059,728

PACKING CUP

Burns Dick, Ferguson, Mo., assignor to Wagner Electric Corporation, St. Louis, Mo., a corporation of Delaware Application May 29, 1933, Serial No. 673,367

10 Claims. (Cl. 309—34)

My invention relates to packing cups for pistons and more particularly to improvements in packing cups used in fluid pressure producing systems, as for example, hydraulic braking systems, for preventing the escape of fluid under pressure past the piston.

One of the objects of my invention is to produce a packing cup of flexible material, the lip or edge of which will engage the wall of the cylinder with a uniform pressure throughout its circumference.

Another object of my invention is to so construct a flexible packing cup that the radial pressure between the lip and the cylinder will be produced by an expansible means carried by the cup and acting at substantially right angles to the wall of the cup.

Other objects of my invention are to produce a packing cup of flexible material, as for example, rubber, moulded cellulose compound, or light metal, that will be simple in construction, economical to manufacture, and which will operate efficiently for a long period of time.

Still other objects will become apparent from the following description of three embodiments of my invention taken in connection with the accompanying drawing in which Figure 1 is a view, partly in cross section, of the fluid parts of a braking system equipped with two forms of cups embodying my invention; Figure 2 is a cross sectional view of the packing cup in the fluid compressor; Figure 3 is a cross sectional view of one of the packing cups in the brake actuating motor; Figure 4 is a cross sectional view of a metal packing cup embodying my invention; and Figure 5 is an enlarged view of a portion of the cup in Figure 4 showing its relation to the cylinder wall.

Referring to the drawing in detail, the numeral 1 indicates the well known compressor of a hydraulic brake system which is provided with a cylinder 2, a piston 3, and a reservoir 4 communicating with the cylinder ahead and at the rear of the piston in its retracted position by the passages 5 and 6. The cylinder of the compressor is connected to the brake shoe actuating motors 7 by a conduit 8 (one motor only being shown). The motor comprises a cylinder 9 and a pair of pistons 10 adapted to actuate the ends of the brake shoes 11. Since the braking system must be as fluid-tight as possible, the pistons 3 and 10 are provided with packing cups 12 and 13 respectively.

In the brake systems now in use, the packing cups are constructed of rubber, an example of the compressor piston packing cup being shown in Figure 4 of Loughead Patent No. 1,847,402 issued March 1, 1932, and an example of the motor piston packing cup being shown in Figure 1 of Oliver Patent No. 1,711,206 issued April 30, 1929. These rubber cups rely on the resiliency of the rubber to retain the seal between the lip of the cup and the cylinder wall. This resiliency, however, is destroyed if overheating occurs, or if the rubber is depreciated by the use of a poor liquid, thereby resulting in an inefficient seal, especially when the cups are in a non-operative position.

The compressor cups are also generally held against the head of the piston 3 by a retracting spring 14 bearing on its flat central portion which also tends to draw the lip of the cup inwardly and thus reduce its pressure on the cylinder wall.

Attempts have been made in the past to use springs to expand the lip of the cup and create a uniform pressure between the lip of the cup and the cylinder wall, but these constructions have been found to be impracticable because the spring operates in a direct outwardly radial direction and a very small increase or decrease of the diameter in which they act, causes a very large increase or decrease in the radial pressure of the spring, thus producing unsatisfactory sealing results under different operating conditions.

In accordance with one embodiment of my invention, the rubber packing cup 12 for the compressor is provided at its forward end with an integral inwardly extending circumferential flange 15 which forms, with the inner wall of the cup, a circumferential recess or groove 16. An expansible coil spring 17 is interposed between the base of the cup and the groove 16 and acts on the flange 15 in a direction substantially parallel to the axis of the cup and at a distance from the peripheral wall of the cup. The spring 17 is of such resiliency and dimensions that it has a considerable working range, thus producing a substantially uniform axial force over a considerable distance in its path of expansion. The force produced by the spring upon the flange 15 causes the cup to be stretched and the lip thereof to be expanded outwardly, as shown by the dotted line of Figure 2. This radial expansion is a result of the reaction caused by the spring 17 acting on the flange at a point spaced from the line of support of the forward edge of the lip of the cup. The inner wall of the cup is tapered to cause the extreme forward edge of the cup to have the greatest radial expansion. As the ends of the coiled spring are in contact with the flange 15 at all points, the outward expansion of the lip of the cup will be uniform, thus producing a uniform pressure between the cup and the cylinder wall. The large working range of the spring 17 also insures that pressure between the walls of the cup and cylinder will be maintained throughout the wearing life of the cup.

The inner surface of the base of the cup 12 is made convex and has mounted thereon a convex retainer 18 against which the end of the spring 14 abuts. The purpose of this construction is to prevent the rubber in the base of the cup from floating radially outwardly by the action of the spring 14 and also to prevent any tension in the inner peripheral wall of the cup which causes the inward deflection of the lip of the cup previously referred to.

Referring to Figure 3, I have disclosed my invention applied to a packing cup made from semi-flexible moulded material, as for example, a cellulose compound. The cup 13 is shown as screwed to the head of the piston 10 and the lip portion provided with an inwardly extending circumferential flange 19. The intermediate wall of the cup is of less thickness than the base portion to provide flexibility whereby the lip portion may be expanded outwardly. The flange 19 is also radially corrugated, as shown, to permit of this expansion. The expansible spring 20 is interposed between the head of the piston and the flange 19 as shown.

In assembling the structure, the lip of the cup is normally formed to snugly fit the cylinder and then the spring released after the cup is placed in the cylinder. The radial expansion caused by the spring, and shown in dotted lines, need not be great under these circumstances in order to create sufficient sealing pressure between the lip and the cylinder wall.

In Figures 4 and 5, I have shown my invention applied to a cup made from thin, flexible metal, as for example, brass. In this construction the lip 21 of the cup 22, is flared. An annular flange ring 23 is soldered or otherwise secured to the inner wall of the cup near the lip. This flange is corrugated, as shown, to permit the lip of the cup to be slightly expanded by the action of the expansible spring 24. A reinforcement is provided in the bottom of the cup upon which the spring seats. The lip of the cup is ground to a circumference to snugly fit the cylinder prior to assembly and release of the spring. The cup is then placed in the cylinder and the spring released, thus producing a pressure between the edge of the lip and the wall in the manner shown in Figure 5.

Having fully described my invention, what I claim as new and desire to secure by Letters Patent of the United States is:

1. In fluid pressure apparatus, the combination with a piston sealing cup of flexible material provided with an inwardly extending flange adjacent its lip, of means for increasing the contact pressure of the lip of the cup on the cylinder wall, said means comprising a coiled spring having one end engaging the bottom of the cup and the other end engaging the inwardly extending flange on the cup adjacent its lip, and applying pressure to the flange in a direction which is at an angle to a plane perpendicular to the cup axis.

2. In apparatus of the class described, a flexible packing cup provided with an inwardly extending part on its forward edge, and means for forcing the edge of said cup radially outwardly, said means comprising an axially expansible coiled spring expanding in the axial direction of the cup and producing a force acting on the inwardly extending part of the cup and in a direction substantially parallel to the cup axis.

3. A packing cup having a flexible cylindrical wall carrying an inwardly extending part at its forward end, and an axially expansible coiled spring acting in a direction substantially parallel to the axis of the cup and having one end engaging said inwardly extending part at a distance from the wall of the cup.

4. A packing cup having a flexible cylindrical wall provided with an inwardly extending circumferential flange at its forward edge, and means forcing the external forward edge of said wall outwardly, said means comprising an expansible coiled spring engaging the base of the cup and the flange, the force exerted by said spring being in a direction substantially parallel to the axis of the cup and acting on the flange at a distance from the wall of the cup.

5. A yieldable packing cup having a base portion and a yieldable cylindrical wall, the forward end of said wall being provided with an integral inwardly extending flange forming a circumferential groove, and an axially expansible coiled spring having one end engaging the base of the cup and the other end engaging the flange at said groove.

6. A packing member having a flexible wall and an inwardly extending circumferential flange at its forward end, said flange being so formed that its internal diameter may be slightly increased to thereby permit slight circumferential expansion of the forward end of the packing member, and a coiled expansible spring axially positioned within said cylindrical wall and exerting a force upon the flange in a direction substantially parallel to the axis of the cup whereby the forward edge of the wall will be forced radially outwardly.

7. A packing member having a flexible wall and an inwardly extending circumferential flange at its forward end, said flange being provided with radial corrugations which taper into a smooth surface at its juncture with the wall, and a coiled expansible spring lying within the cylindrical wall and exerting a force upon said flange in a direction substantially parallel to the axis of the cup and at a distance from the wall.

8. A packing member comprising a cup formed of a flexible metal and provided with a flared open end, an inwardly extending flange secured to the inner surface of the open end of the cup, and an expansible spring engaging the bottom of the cup and the flange.

9. In a fluid compressor provided with a cylinder and a piston, a packing cup for the piston provided with an inwardly extending flange at its forward end and a raised surface on the bottom of its interior, a coiled spring interposed between the base of the cup and the flange, and a dished retainer engaging the raised surface of the cup bottom, said retainer being provided with a peripheral groove forming a seat for the end of a coil spring.

10. The combination of a piston and cylinder, a packing cup for the piston provided with a convex surface on the bottom of its interior, and a convex annular disc cooperating with the convex cup surface, said disc being provided with a peripheral groove for seating the end of a coil spring.

BURNS DICK.